J. H. KALB.
Street Lamp.
No. 29,382.
Patented July 31, 1860.
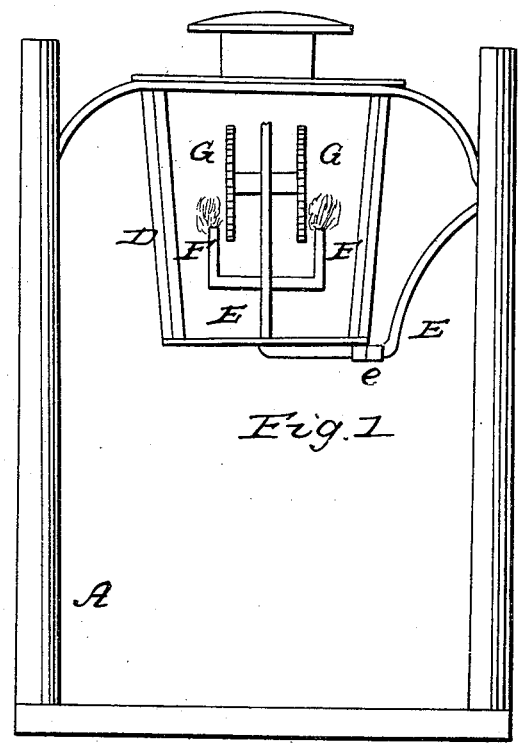
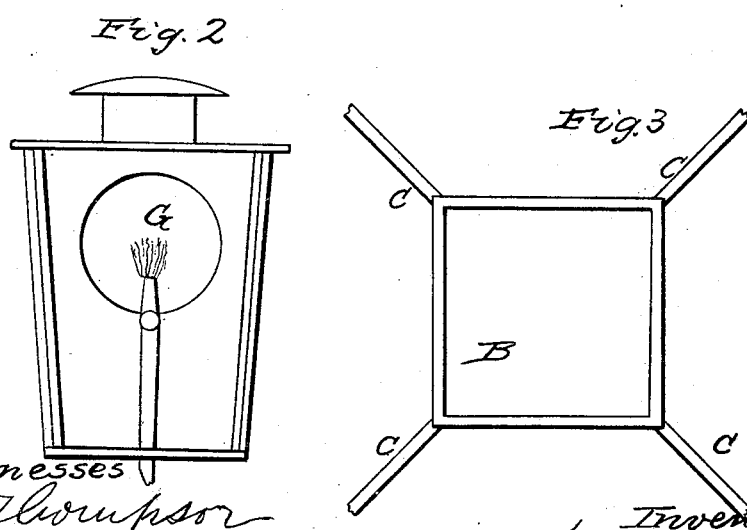

UNITED STATES PATENT OFFICE.

JACOB H. KALB, OF CHARLESTON, SOUTH CAROLINA.

STREET-LIGHT.

Specification of Letters Patent No. 29,382, dated July 31, 1860.

*To all whom it may concern:*

Be it known that I, JACOB H. KALB, of Charleston, South Carolina, have invented certain new and useful Improvements in Street-Lights; and I do hereby declare that the following is a full, clear, and exact description of the same, reference being had to the accompanying drawings and to the letters of reference marked thereon.

The nature of my invention consists in suspending a reflecting lamp in the center of cross streets by means of rods or bars which extend up from the four corners of the street, as will be set forth.

In the annexed drawings A A represent posts which are erected at the corners of cross streets. Where the streets are so laid out as to cross each other at right angles there will be four corners; there are consequently four posts erected, one at each corner.

B represents the lamp holder, and C C C C, represent the rods or bars which pass up from the four posts (A) and which connect in the center of the streets to the lamp holder B, as is represented in Figure 3.

D is the lamp which is suspended in the holder B, and E represents a gas pipe which conveys gas into said lamp. The pipe E may pass up by the side of the post at one of the corners or it may run through it, said pipe being provided with a coupling at $e$.

G G represent the reflectors which are secured in the lamp and are four in number, one for each street.

F F represent the gas burners which stand in front of the reflectors and which are also four in number.

The reflectors and burners are so arranged as to throw light down and along the four cross streets. The object of this arrangement is to avoid the necessity of so many street lights and at the same time afford more light for the streets. Four lights placed in the center of the cross streets will give more light than twice as many scattered along the side walk, for the lights along the side walks are always more or less dimmed and obscured by the shade trees, whereas the rays of light from this lamp would be entirely unobstructed.

This lamp may be used for lighting public squares markets railroad depots, halls, &c., with great economy.

Having thus fully described my invention what I claim as new and desire to secure by Letters Patent is—

The employment of the lamp D, provided with gas burners (F, F,) and reflectors (G, G,) when the same is used in connection with the gas pipe E, posts (A,) and the rods or bars (C, C,) and the whole arranged as and for the purpose specified.

JACOB H. KALB.

Witnesses:
 M. THOMPSON,
 THOMAS H. THOMPSON.